United States Patent [19]

Baker

[11] 4,019,223
[45] Apr. 26, 1977

[54] APPARATUS FOR CUTTING POULTRY CARCASS

[75] Inventor: Eric Ralph Lloyd Baker, Coquitlam, Canada

[73] Assignee: Elsie Jennie Baker, Coquitlam, Canada

[22] Filed: Oct. 14, 1975

[21] Appl. No.: 622,168

[30] Foreign Application Priority Data

June 6, 1975  Canada .............................. 228698

[52] U.S. Cl. .................................................. 17/11
[51] Int. Cl.$^2$ ........................................ A22C 21/00
[58] Field of Search ..................... 17/11, 52, 57, 61

[56] References Cited

UNITED STATES PATENTS

| | | | |
|---|---|---|---|
| 2,957,198 | 10/1960 | Ciancido et al. | 17/11 |
| 3,284,846 | 11/1966 | Reeves | 17/11 |
| 3,890,674 | 6/1975 | Fradin | 17/11 |
| 3,908,230 | 9/1975 | Hartmann | 17/52 |
| 3,943,600 | 3/1976 | Cramer | 17/11 |
| 3,946,461 | 3/1976 | Martin | 17/11 |

*Primary Examiner*—Louis G. Mancene
*Assistant Examiner*—James D. Hamilton
*Attorney, Agent, or Firm*—Cushman, Darby & Cushman

[57] ABSTRACT

Apparatus for cutting poultry carcasses into pieces which can be from two pieces up to twelve pieces, having a power driven feeding mechanism which moves a carcass along support while it is being cut into pieces automatically by various blades. The support includes a guide bar having a projecting end suitable for being inserted through the central cavity of a poultry carcass. The feeding mechanism includes twin pneumatic cylinders arranged to cause reciprocating motion of a claw along the support, the claw being arranged to engage the carcass when this is positioned on the bar, and to cause movement of the carcass through the various cutting blades which are mounted adjacent to the support. The bar projects forwards from a supporting slideway having downwardly sloping side surfaces, and the cutting blades include a fixed blade projecting downwardly from the bar in front of the slideway for slitting the wish-bone of the carcass, and a band saw which subsequently removes the drumsticks and the breast point of the carcass and allows the breast of the carcass to be separated, the separate portions then being supported by the side surfaces of the slideway. Subsequently, two blades remove the wings of the carcass, a blade slits the back bone, and transverse blades move into a slot in the slideway to cut the carcass in half longitudinally. The cut parts fall from the apparatus onto a slatted conveyor belt which delivers the cut parts to bags or other containers.

25 Claims, 9 Drawing Figures

Fig. 1

APPARATUS FOR CUTTING POULTRY CARCASS

This invention relates to apparatus for automatically cutting a poultry carcass into a suitable number of pieces. The preferred form of the invention cuts a carcass into up to twelve pieces, but is readily adjustable to cut a carcass into fewer, larger pieces if desired.

Apparatus for automatically cutting poultry carcasses into pieces is known for example from U.S. Pat. No. 2,807,046 which issued Sept. 24, 1957 to Hebenheimer, and U.S. Pat. No. 3,639,945 which issued Feb. 8, 1972 to Duncan. These machines use relatively complicated conveying means including a conveying chain for the poultry.

Also known are devices of hand operated type for slitting the carcasses of poultry. These may include a bar which projects into the central cavity of the carcass during the cutting operation for example as shown in U.S. Pat. Nos. 2,941,238 which issued June 21, 1960, and 3,284,846, which issued Nov. 15, 1966, both to Reeves, and U.S. Pat. No. 2,957,198 which issued Oct. 25, 1960 to Cianciolo.

The present invention provides an apparatus which is fairly compact, and which cuts a poultry carcass into as many as twelve pieces, substantially automatically, and which does not require the use of a conveyor of the chain type.

In accordance with the present invention, apparatus for cutting poultry comprises support means including a guide bar having a projecting end suitable for being inserted through the central cavity of a poultry carcass, and a power driven feeding mechanism for moving the carcass along the support means, this feeding mechanism including power cylinder means arranged to cause reciprocating movement of claw means along the support means. The claw means are arranged to engage the carcass when the latter is positioned on the bar, and to cause movement of the carcass through cutting blade means mounted adjacent said support means on operation of said cylinder means.

The claw means preferably includes a holder carrying two hingedly movable elements having sharpened end portions, these elements can admit between them a carcass on the bar, to an engaged position in which the elements extend generally towards each other to grip the carcass between them. The elements move from the disengaged position to the engaged position automatically so as to grip the carcass and move it relative to the blade means when the claw means move in the feeding direction. The hinged elements may be biased into the engaged position by spring means, so that the elements can move into the disengaged position against the spring means when a part of each hinged element is acted on by a stop which operates to open the elements when the claw is in its most forward position.

The bar may project forwards from a supporting slideway forming part of the support means and having side surfaces which slope away from a central ridge area and suitable for supporting the sides of the carcass while the wings are cut off. To allow the carcass to pass from the bar onto the supporting slideway, first blade means are provided to cut the breast portion of the carcass to allow separation at the breast before the carcass moves onto the supporting slideway.

The power cylinder means are preferably mounted rearwardly of the supporting slideway and extend parallel rearwardly of the supporting slideway and extend parallel to the bar and the slideway, the piston rod means thereof projecting forwardly beyond the slideway when fully extended so that the claw means can grip a carcass on the bar and move this, by retraction of the cylinder means, rearwardly along the bar and along the slideway.

The ridge area of the supporting slideway preferably includes a grooved portion into which projects a back bone splitting blade which slits the back bone of the carcass as it moves along the slideway. Also, transverse blade means are provided carried by a movable mounting arranged to move these blade means from a position spaced away from the slideway into a transverse slot in the slideway to cut the carcass into longitudinal portions.

The apparatus also includes deflecting plates which direct cut pieces of the carcass onto a conveyor belt below the apparatus. The conveyor belt is driven in step-by-step manner by pneumatic cylinder means, so as to be stationary while receiving the pieces of one or two carcasses, and then moved to expose a fresh area of the belt.

A preferred form of the apparatus will now be described by way of example with reference to the accompanying drawings, in which.

Figure 1:
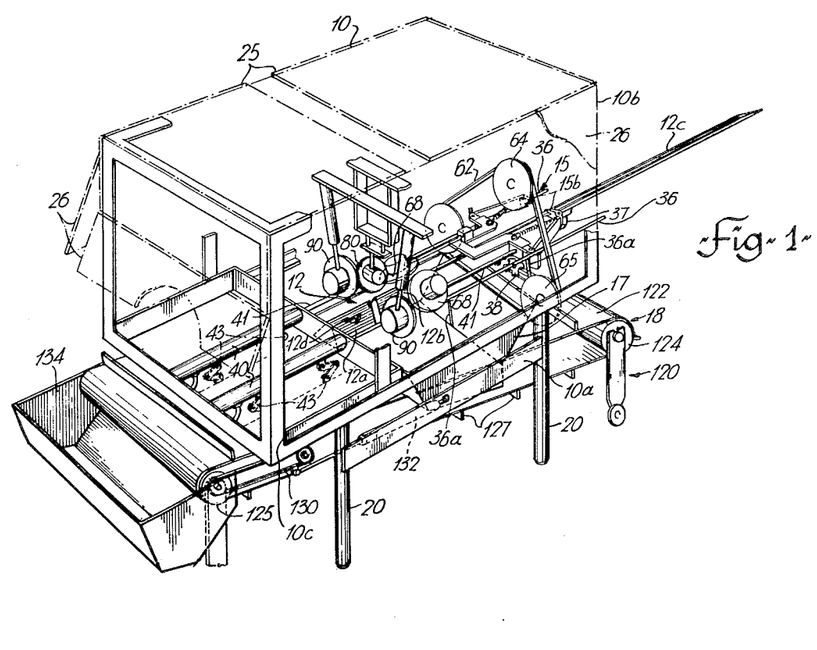
FIG. 1 is a perspective diagrammatic view of the whole apparatus.

The main parts of the apparatus will firstly be described with reference to FIGS. 1 and 2. These include frame means 10 including a lower frame 10a, and an upper frame 10b supported by frame 10a and adjustable forwards and backwards on the lower frame 10a. A lower rear portion 10c of the upper frame 10b carries at its forward end the support means 12 including a supporting slideway 12a, 12b and a forwardly projecting guide bar 12c, described in more detail below. The support means is associated with various cutting blade arrangements within the upper frame 10b which will be described in more detail below. Carcasses are moved along the support means 12, from the projecting end of the bar to the rear end of the slideway 12a by a power driven feeding mechanism indicated generally at 15, and which includes power cylinder means 40 arranged to cause reciprocating movement of claw means 15b which grip the carcass and move it rearwardly along the support means. The apparatus also includes deflecting plates 17 forming part of a baffle of funnel type configuration leading to conveyor indicated generally at 18.

The lower frame 10a is formed of angle iron, having legs 20, and two longitudinal side members 22.

The upper frame 10b is also formed of angle iron, and rests on the longitudinal members 22 of the lower frame and is adjustable forwards and rearwards thereon. The upper frame, in addition to the support means 12 and associated parts, also carries a band saw, a back bone cutting blade, wing blades, and a transverse quartering blade which will be described in more detail below.

The upper frame 10b is covered with a cover 25 which fits across the top of the frame, and which includes panels 26 which partially enclose the front and rear ends of the frame, and fully enclose the sides of the frame, for safety and projection of the machine operator and to keep foreign objects from entering the machine during operation.

Figure 3:
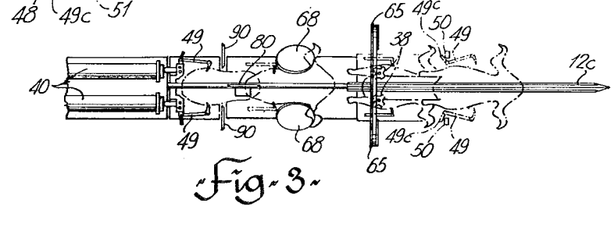
FIG. 3 is a diagrammatic plan view of the parts shown in FIG. 2.
Figure 4:
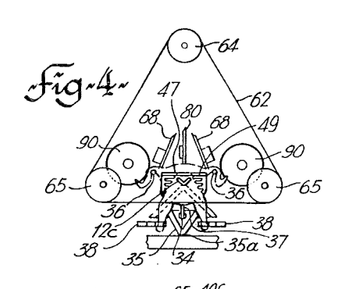
FIG. 4 is a diagrammatic front view of the main operative components of the appartus.

The support means 12 is carried by the upper frame 10a via the part 10c and two forwardly extending rods 11 which pass through lower lugs 11a held by two parts 12a, 12b of a slideway 12, these parts being separated by a gap 31. Both these parts of the slideway are triangular in cross-section, each having flat, smooth side surfaces which slope away at about 45° from a central ridge area. The ridge area of the front part 12b incorporates the rear portion of a forwardly projecting guide bar 12c, this guide bar being of triangular cross section but inverted relative to the slideway so as to have an upwardly facing groove for receiving the back bone of the carcass and which continues along the ridge area of slideway part 12b. The front end of the bar is pointed, to facilitate its insertion through the central cavity of a carcass. Although the term "bar" is used, this is intended to be broad enough to cover any elongated member of suitable dimensions for being passed through the central cavity of the carcass.

Also projecting from the forward end of the slideway part 12b are guide rods 34, 35 and 36. Rod 34 is a horizontal rod which extends underneath the guide bar 12c and has its forward end slotted to receive the rear lower end of a wishbone cutting blade 37 which blade has its upper end held by guide bar 12c. This blade 37 has a downwardly rearwardly sloping front edge for cutting the wishbone, and rod 34, which is flexible to adjust to various carcass sizes, serves to support the breast bone during a further cutting operation to be described.

Rods 35 extends forwards from the sides of part 12b and slope forwardly downwardly and also converge towards each other to meet at an apex 35a about level with the base of upper frame 10b. This apex coincides with the front end of a drumstick feeder guide constituted by two guide wheels 38 which lie in a common horizontal plane one on each side of apex 35a of the guide rods. The wheels 38, shown best in FIG. 6, have four deep part-circular shaped recesses around their circumference, which receive the drumsticks of a poultry carcass and guide these onto rods 35, and also hold the drumsticks to prevent distortion while these are cut.

Rods 36 extend forwards from brackets 36a which support these rods just above the front of slideway part 12b, and serve to support the wings of the carcass while these are cut by blades to be described.

At the rear end of the slideway 12b are mounted the power cylinder means 15a comprising two parallel pneumatic cylinders 40 having piston rods 41, these cylinders being mounted on the upper frame 10b via the part 10c which also mounts rods 11 which support the slideway 12, 12b. The part 10c is movably linked to the base of frame part 10b by links 43 which allow vertical adjustment of part 10c by screw adjuster 44, while maintaining part 10c level. Thus, the cylinders 40 and associated parts, and support means 12 and bar 12c, can all be vertically adjusted as a unit relative to frame 10b. FIG. 2 shows the lowered position. The cylinders 40 extend parallel to the support means constituted by the slideway 11 and bar 12c, and the piston rods 41 carry the claw means 15b which can be extended by operation of the cylinders to a forward position shown ghosted in FIG. 3. The claw means, which are shown in detail in FIG. 5, include a transverse holder plate 47 extending across the ends of the two piston rods 41 and held firmly thereto, the holder plate having forwardly extending side portions 47a to the front end of which are hinged at 48 two gripping elements 49. These elements 49 each include a forwardly extending part 49a and an inwardly extending part 49b having sharp inwardly pointing teeth. The elements 49 also include outwardly extending actuator parts 49c capable of being engaged by stationary stops 50 shown in FIG. 3 when the claw means is fully advanced to open the elements 49 (as shown ghosted in FIG. 3) sufficiently that they can admit between them a poultry fed onto the bar 12c. Elements 49 are biased into the closed position by springs 49d. Stops 50 are associated with air switches 51 which initiate retraction of cylinders 40 when contacted by elements 49 in their fully open condition (see FIG. 3). The arrangement is such that in the opened position a carcass can be advanced between the elements 49, but when the switches 51 operate cylinders 40 to withdraw the piston rods the parts 49c are removed from stops 50 and the parts 49b are caused to move by springs 49d into the engaged position to firmly grip the carcass and move this along the loading bar, springs 49d causing the claw means to hold the carcass firmly. The pneumatic cylinders 40 are arranged to extend the claw means 15b to a position in which the parts 49b can grip a carcass when in the most forward position shown in FIG. 3 just in front of the thighs. This forward position of the carcass is spaced somewhat behind the forward end of the bar. As seen in FIG. 4, the proportions of the parts 47 and 49 of the claw means are such as to allow teethed parts 49b to lie along the sides of the slideway 12a, 12b.

Figure 2:
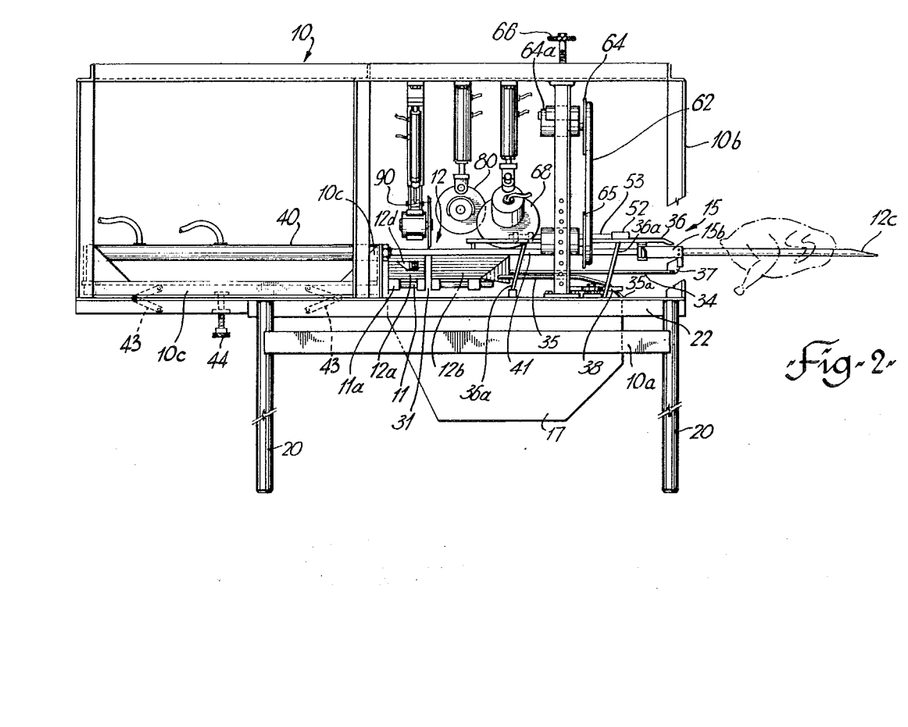
FIG. 2 is a side view of the main operative parts of the apparatus, omitting the conveyor.
Figure 5:
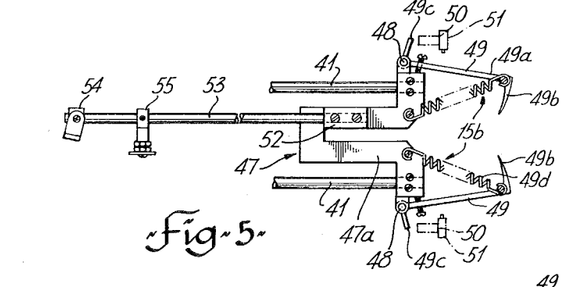
FIG. 5 is a plan view of claw means which form part of the feeding mechanism.

Attached to the upper surface of holder plate 47a is a block 52 which holds a reawardly extending switch trigger rod 53, shown in FIGS. 2 and 5. This rod has switch actuators 54 and 55 and spaced apart adjacent its rear ends, and these actuators operate limit switches (not shown) which automatically control pneumatic cylinders which move wing blades, a back bone splitting blade, and quartering blades described below.

Retraction of the cylinders 40 causes movement of a carcass over first blade means, which includes the wishbone cutting blade 37, and which blade means cuts the carcass sufficiently to allow the carcass to be opened up at the breast and to pass onto the slideway with the carcass side portions each supported on one of the side surfaces of the slideway; and further retraction of the cylinders 40 draws the carcass through further blade means which operate on the carcass while it is supported on the slideway.

The first blade means includes, in addition to wishbone blade 37, a band saw 62, which is of triangular form as indicated in FIG. 4, being supported by a central upper pulley 64 and two side pulleys 65 at the same level as each other. The arrangement of pulleys is such that the lower, operative, reach of the band saw passes under the loading bar 12c in front of the slideway part 12b, under the guide rods 36, and over guide rods 34 and 35. The height of the saw is chosen so that, with the height adjustment of the part 10c in the lower position as shown (and with the support 12 and bar 12c similarly in lowered postion), the band saw cuts both the thigh bones or drumsticks of the carcass (which are suitably supported during the cutting operation by guide rods 35) as the carcass moves along bar 12c, and also cuts off the breast point of the carcass while the breast is supported by rod 34. The band saw is driven by a hydraulic motor 64a coupled to pulley 64, pulleys 65 being idle. A handwheel 66 is connected to screw adjustment for pulley 64 and its associated motor to allow adjustment of the band tension.

The further blade means, which operate on the carcass while it is supported on the slideway parts 12a and 12b, include two symmetrically placed wing cutting blades 68, a back bone splitting blade 80, and a transverse quartering blade 90.

Figure 7:
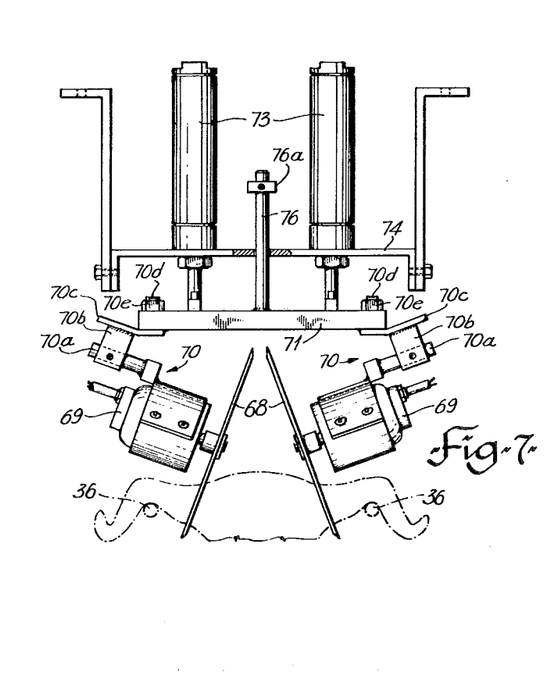
FIG. 7 is a front view of a wing blade assembly.

The manner in which the wing cutting blades 68 are held, i.e. symmetrically arranged with an outwards slope corresponding roughly to the slope of the sides of support 12a, 12b, is best shown in FIG. 7. Each blade is carried by the spindle of a hydraulic motor 69, the motors each being connected by a mounting 70 to a vertically movable cross-head 71. Mounting 70 includes a rod 70a adjustably held by a set screw in block 70b, this block being connected by plate 70c and stud 70d to the cross-head 71, to which stud 70d is secured by nut 70e. Cross-head 71 is movable vertically by two pneumatic cylinders 73 mounted on fixed transverse member 74, the downwards movement of the cross-head being limited by rod 76 having its lower end fixed to the cross-head and passing through member 74, and having a stop 76a at its upper end which acts against the top of the cross-head. With this arrangement the cylinders 73 can be retracted to raise the blades 68 clear of the claw means 15b while these move a carcass into position with the wings just in front of the blades 68, and the cylinders 73 are then extended to position the blades for cutting off the wings on further movement of the carcass. This movement is achieved automatically by limit switches operated by the switch trigger rod 53.

Figure 8:
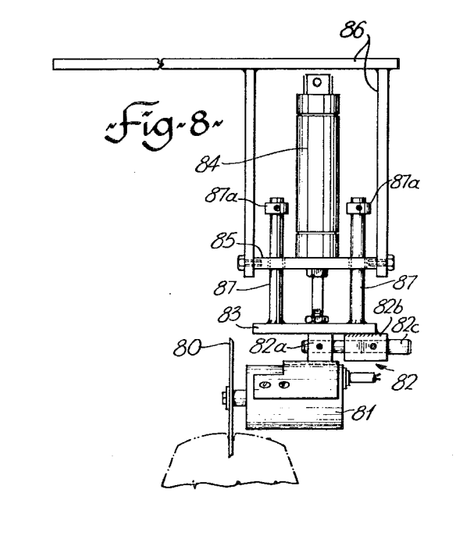
FIG. 8 is a front view of a back bone splitting assembly.

As shown in FIG. 8, the back bone splitting blade 80, which extends fore and aft of the apparatus, is carried by the spindle of hydraulic motor 81, connected by means of a mounting 82 to a vertically movable cross-head 83. The mounting 82 includes a first block 82b secured to cross-head 83, each block receiving a rod 82c which is adjustable in block 82b. Cross-head 83 is vertically movable by a pneumatic cylinder 84 mounted on support 85 which is fixed by frame members 86 to the upper frame 10b. Extending upwards from cross-head 83 are two rods 87 which pass through support 85 and have steps 87a at their upper ends to limit downwards movement of the cross-head 83. With this arrangement, the blade 80 can be lifted so as not to interfere with the claw means 15b as this passes underneath, and can be lowered into a cutting position to split the back bone, this being achieved by switches operated by switch trigger bone 53. For this purpose, in the lowered position, the blade 80 projects into the groove in the top side of bar 12c which forms the ridge area of support part 12b, the blade being accommodated between the forwardly extending portions 47a of holder 47 of the claw.

Figures 6, 9:
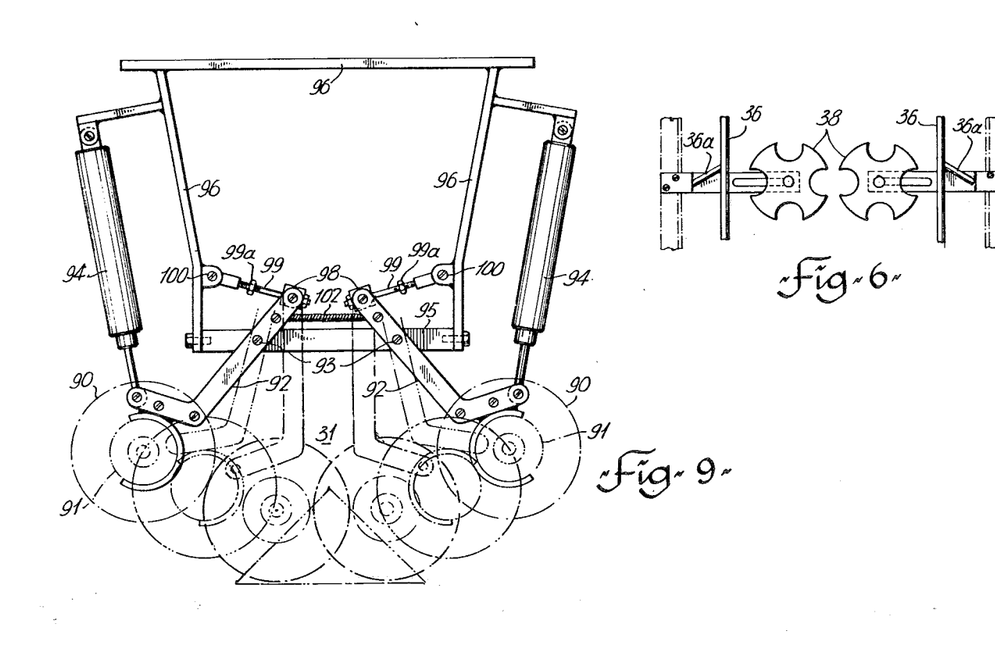
FIG. 6 is a plan view of a drumstick feeding device.
FIG. 9 is a front view of a quartering blade assembly.

Behind the back bone splitting blade are two transverse quartering blades 90, each driven by a hydraulic motor 91 mounted for swivelling movement about a horizontal axis as shown in FIG. 9. Each motor 91 is fixed to a swivelling arm 92 movable about a horizontal pivot 93 by pneumatic cylinder 94. Pivots 93 are carried by a cross arm 95 connected to upper frame 10b by members 96 which also carry the upper end of cylinders 94. The upper ends of arms 92 extend beyond pivots 93 and are provided with sliding sleeves 98 each slidable on a rod 99 between stops 99a, rod 99 being pivoted at 100 to the side members 96 so that stops 99 limit the swing movement of arms 92. Arms 92 are connected by a tensile spring 102 which urges the upper ends together and counteracts the weight of motors 91 at the lower ends of the arms. The arrangement is such that extension of cylinders cause the blades 90 to swing inwards onto the carcass, cutting this cross-wise, the blades entering into the gap 31 between parts 12a, 12b of the slideway. The blades are spaced apart longitudinally of the apparatus so that they can overlap in the gap 31, as indicated in FIG. 9. The pneumatic cylinders 94 are automatically operated by switch trigger rod 53 after the claw means 15b has moved rearwardly to a position in which they are behind the slot 31, and when the carcass is suitably positioned across this slot.

Below the band saw 62, and the slideway 12, is situated a loading baffle including deflecting plates 17 which direct the cut pieces of the carcass onto the conveyor 18 mounted below this baffle.

The conveyor includes a frame 120 with legs having caster wheels enabling the frame to be moved around independently of the remainder of the apparatus. The frame carries a flat endless belt 122 which slops from a lower roller 124 to an upper roller 125, the conveyor being normally positioned as shown with the lower roller 124 just in front of the front end of the baffle and the upper roller 125 positioned behind the rear end of the cylinders 40. An arrangement is provided for locking the conveyor in this position.

The belt 122 carries transverse slats or cleats 127 high enough to prevent the cut poultry pieces from sliding down the belt. These cleats are spaced apart on the belt by an amount equivalent to the force and aft dimension of the lower end of the baffle. The belt is moved by drive means connected to the upper roller 125, these drive means including a sprocket chain 130 having one reach connected to the piston rod of a pneumatic cylinder 132, and passing over a sprocket connected by a pawl and ratchet mechanism to the upper rollers 125, so that the roller and the belt are driven in such directions as to move the upper reach of the belt upwards towards the upper roller when the piston rod of the cylinder 132 is being retracted, no movement occurring on extension of the piston rod. This drive mechanism is such as to cause step-by-step movement of the belt 122, each step of movement being equivalent to the distance between two adjacent slats 127. The operation of pneumatic cylinder 132 is controlled in sequence with that of the pneumatic cylinders 40 so that the belt is only moved when the pieces of one or two complete chickens have been deposited on the belt.

At the upper end of the belt a bag loading horn 134 is provided for directing the cut chicken pieces into containers such as bags held underneath this horn. The slope of the conveyor is such that this horn is at suitable operator's height.

The mobility of the conveyor provided for by the caster wheels on the frame both allow the conveyor to be moved from under the cutting apparatus for ease of cleaning and also allow this to be positioned at right angles to the longitudinal direction of the cutting apparatus, if desired.

All parts of the apparatus which come into contact with the poultry or poultry pieces are made of non-corrosive materials to eliminate oxidation and for purposes of hygiene and easy cleaning.

The operation of the apparatus for a usual cutting operation, producing nine pieces, will now be described. An operator loads a poultry carcass onto the front end of the loading bar 12c with the back bone at the top of the bar and breast downwards. When the carcass is in position, a switch (for example a foot switch) may be operated to extend the piston rods 41 of the feeding mechanism, so that the claw 15b advances over the rear end of the carcass until the claw element 49 are opened by engagement of parts 49c against the stops 50. The carcass is then inserted between the claws, and the air switches 51 then operate to withdraw the claw 15b causing elements 49 to engage the carcass just in front of the thighs. On retraction of the piston rods 41, the carcass is caused to move gradually through the cutting blade means, with the fixed blade 37 firstly slitting the wishbone. The band saw 62 then removes the drumsticks and the breast point while the rods 35 support the drumsticks and while rod 34 holds the breast. This allows the sides of the breast to be separated and to pass onto the supporting slideway part 12b. The carcass is supported firmly on the sloping sides of the slideway, being held by the spring action of the claw elements 49, while the wings are removed by the wing blades 68 which are caused to move into the cutting position by trigger rod 53 as soon as the claw means is clear of these blades, these wing blades cutting off the wings while they are supported by rods 3 and while the carcass moves along. When the carcass has moved a little further along the slideway part 12b, back bone blade 80 is caused to descent by the switches operated by rod 53, and moves into the groove on the ridge area of part 12b cutting the carcass along the back bone. The claw means then move the carcass to its rearmost position, straddling the transverse slot 31 in the supporting slideway, and with the claw means 15b disposed behind this transverse slot, the pneumatic means which actuate the quartering blades 90 are operated to cause these blades to swing towards the carcass and cut this into two front and two rear segments. The front segments then fall from the slidway and the rear segments also fall therefrom on a slight forwards movement of the claw means 15b. The pieces of chicken fall onto the belt 120 of the conveyor, which is then operated to expose a new area of belt under the loading baffle. The conveyor operates as described to transfer the chicken pieces to a bag held under the bag loading horn 134.

The apparatus can be adjusted to cut chicken into two pieces by disengaging the band saw blade, wing blades and quartering blades, so that the back bone splitting blade 80 (and blade 37) are the only operative blades. For best operation in this mode, the screw 44 is adjusted to raise the cylinders 40 and the support 12, and a large diameter blade is placed on the backbone splitting blade motor 81. For four pieces the adjustments are generally the same, except that the quartering blades are activated as well as the backbone splitting blade. For eight pieces, the support 12 is maintained in the relatively raised position, the wisbone cutting blade 37 and rod 34 are removed, and all motors are actuated. With this latter arrangement, the breast point passes above band saw 62 and so is not removed, but the drumsticks are removed, as well as the wings, and the back of the carcass is split and quartered. For twelve pieces, the cylinders 40 and support 12 are lowered, wishbone blade 37 is in place and is extended downward to open the breast completely giving two breasts instead of one. Also, the quartering blades are arranged to be activated twices at predetermined intervals so that the back part of the carcass is cut into six pieces by these blades and the backbone splitting blade.

This invention is not limited to any precise arrangement of cutting blades, and for example the back bone splitting blade may be positioned below the support means rather than above, if desired, acting through a slot in the support means. The essential novelty of the invention is believed not to reside in the particular blade arrangment, except insofar as this enable the breast portion of the chicken to be separated before it passes onto the slideway 12, but the main novelty of the invention is believed to reside in the way in which the carass is held, firstly by the loading bar and then by the slideway, in cooperation with the feeding apparatus constituted by the pneumatically operated claw means. This arrangement uses the natural cavity of the carcass to hold this firmly through the various cutting operations, the firm holding being partly due to the natural muscle resistance of the carcass. The claw operates well even on carcasses of different sizes.

A further feature of the invention is that the position of the blades can readily be adjusted to accommodate different sizes of carcasses.

I claim:

1. Apparatus for cutting poultry carcasses into several pieces comprising frame means carrying support means including a supporting slideway and a guide bar projecting forwardly of said slideway, said slideway having side surfaces which slope downwardly from a central area ridge which forms a continuation of the top of said guide bar, said bar being suitable for insertion through the central cavity of a poultry carcass, said frame means also carrying power driven feeding apparatus arranged to grip a carcass positioned on said bar and to cause movement of the carcass through cutting blade means mounted adjacent said support means, said cutting blade means including first blade means which are positioned below said bar to cut the breast portion of a poultry fed onto said bar with its back-bone uppermost so that the side portions of the carcass are partially separated before said carcass moves onto said slideway, said side surfaces of the support member being arranged to support the side portions of the carcass and being associated with further blade means for performing subsequent cutting operations on the carcass while supported on said side surfaces.

2. Apparatus according to claim 1, wherein said first blade means includes a fixed blade for splitting the wish-bone of a carcass as it moves along said guide bar, and blade means for removing the breast point thereof.

3. Apparatus according to claim 1, wherein said first blade means includes a fixed blade positioned under said guide bar for slitting the wish-bone of the carcass as it moves along the bar, and a band saw having an operative reach extending under said bar and arranged to cut off the drum-sticks of the carcass as it moves along said bar.

4. Apparatus according to claim 3, wherein said support means and guide bar are vertically adjustable relative to said band saw, whereby the apparatus can be adjusted so that said band saw cuts off only the drumsticks, or so that the drumsticks and the breast point are cut off.

5. Apparatus according to claim 1, wherein said ridge area of the slideway includes a grooved portion, into which groove projects a back-bone splitting blade which splits the back-bone of a carcass as it moves along the slideway.

6. Apparatus according to claim 1, wherein said slideway has a transverse slot therein, said apparatus further comprising transverse blade means carried by a movable mounting arranged to move said transverse blade means into said slot for transversely cutting parts of a carcass held on said support.

7. Apparatus according to claim 1, wherein at least some of said blade means are powered by hydraulic motors.

8. Apparatus according to claim 1, wherein said blade means includes stationary and movable blade means, and wherein all of said movable blade means are powered by hydraulic motors.

9. Apparatus for cutting poultry carcasses into several pieces, comprising elongated support means capable of slidably supporting a poultry carcass while said carcass is moved along said support means, said support means including a guide bar having a projecting end suitable for being inserted through the central cavity of a poultry carcass, and a power driven feeding mechanism for sliding the carcass in a straight path along said support means, said feeding mechanism including claw means and power cylinder means arranged to cause reciprocating movement of said claw means along said support means, said claw means being arranged to engage said carcass when the latter is positioned on said bar and to cause movement of said carcass through cutting blade means mounted adjacent said support means on operation of said cylinder means.

10. Apparatus according to claim 9, wherein said claw means includes a holder attached to a piston rod of said power cylinder means and carrying two hingedly movable elements having sharpened end portions, said elements being hinged to said holder and movable from a disengaged position in which the elements can admit a carcass therebetween, to an engaged position in which the end portions of said elements extend generally towards each other to grip the carcass therebetween, said elements being arranged to move from the disengaged position to the engaged position automatically as the claw means starts to withdraw from an advanced position where the carcass is placed on said guide bar so that the carcass may be gripped by said elements and moved in a feeding direction towards said cutting blade means with movement of said claw means.

11. Apparatus according to claim 10, wherein said elements are biased into the engaged position by spring means, said elements being movable against said spring means into said disengaged position by stop means acting on a part attached to said hingedly movable elements as the holder reaches its most forward position relative to the projecting end of said guide bar.

12. Apparatus according to claim 10 wherein said elements each include a forwardly extending part and a sharp edged inwardly extending part.

13. Apparatus according to claim 9, wherein said bar projects from a supporting slideway which slideway forms part of said support means and which has side surfaces which slope away from a central ridge area thereof forming a continuation of said bar, and wherein said cutting blade means includes first blade means positioned to cut open the carcass to allow side portions thereof to be separated and to be supported each on one of said surfaces of the slideway, the apparatus including further blade means disposed adjacent to said slideway for performing further cutting operations on the carcass while supported on said side surfaces.

14. Apparatus according to claim 1, further comprising a conveyor belt located below said apparatus and deflecting means for directing cut pieces of carcass onto said belt, said conveyor including further power cylinder means operated in sequence with the power cylinder means which actuate the power driven feeding appartus, said further power cylinder means being arranged to move said belt in step-by-step manner, whereby said conveyor belt is stationary while receiving carcass pieces and is moved by said further power cylinder means to expose an empty belt area after pieces of one or several carcasses have been deposited thereon.

15. Apparatus according to claim 14, wherein said conveyor belt has a sloping upper reach extending from a lower end underneath the support means, to an upper end having means for guiding poultry pieces into containers, said belt being provided with cleats to prevent the pieces from rolling down the belt and to separate the pieces derived from individual carcasses.

16. Apparatus according to claim 14, wherein said conveyor is movable relative to the support means for ease of cleaning said conveyor.

17. Apparatus according to claim 1, wherein at least some of said blade means are powered by hydraulic motors 18. Apparatus according to claim 9, wherein said blade means includes stationary and movable blade means, and wherein all of said movable blade means are powered by hydraulic motors.

19. Apparatus for cutting poultry carcasses into several pieces, comprising frame means carrying elongated support means including a supporting slideway capable of slidably supporting a poultry carcass while said carcass is moved along said supporting slideway, said support means also including a guide bar projecting forwardly of said slideway, said slideway having side surfaces which slope away from a central ridge area, said ridge area forming a rearwards continuation of said bar, said bar being suitable for insertion through the central cavity of a poultry carcass, said frame means also carrying a power driven feeding mechanism including power cylinder means mounted rearwardly of said slideway, said power cylinder means having piston rod means extending parallel to said bar and slideway and carrying claw means which project forwardly beyond said slideway when the piston rod means are fully extended, said claw means being arranged to engage a carcass when the latter is positioned on said bar and to cause movement of said carcass along said bar and slideway through cutting blade means mounted adjacent said bar and said slideway on retraction of said piston rod means, said cutting blades means including first blade means positioned to cut open the carcass to allow side portions thereof to be separated before moving onto said slideway, so that the separated side portions can each be supported on one of said side surfaces, said apparatus including further blade means for performing further cutting operations on said carcass while the side portions thereof are supported on said side surfaces.

20. Apparatus according to claim 19, wherein said side surfaces slope downwardly from the central ridge area of said slideway, and wherein said first blade means are positioned below said guide bar in front of said slideway and positioned so that when a carcass is moved along said guide bar with its back-bone uppermost the first blade means cut the carcass in such a way as to allow the sides thereof to be opened at the breast portion.

21. Apparatus according to claim 19, wherein said first blade means includes a fixed blade for slitting the wish-bone of a carcass as it moves along said guide bar, and blade means for removing the breast point thereof.

22. Apparatus according to claim 19, wherein said first blade means includes a fixed blade positioned under said guide bar for slitting the wish-bone of the carcass as it moves along the bar, and a band saw having an operative reach extending under said bar and arranged to cut off the drum-sticks of the carcass as it moves along said bar.

23. Apparatus according to claim 22, wherein said support means and guide bar are vertically adjustable relative to said band saw, whereby the apparatus can be adjusted so that said band saw cuts off only the drumsticks, or so that the drumsticks and the breast point are cut off.

24. Apparatus according to claim 19, wherein said ridge area of the slideway includes a grooved portion, into which groove projects a back-bone splitting blade which splits the back-bone of a carcass as it moves along the slideway.

25. Apparatus according to claim 19, wherein said slideway has a transverse slot therein, said apparatus further comprising transverse blade means carried by a movable mounting arranged to move said transverse blade means into said slot for transversely cutting parts of a carcass held on said support.

* * * * *